United States Patent [19]

Johnson et al.

[11] Patent Number: 5,444,587
[45] Date of Patent: Aug. 22, 1995

[54] METHOD AND APPARATUS FOR ATTACHING METALLIC AND CERAMIC MATERIALS

[75] Inventors: Ernest V. Johnson, Phillipston; Allen R. Creamer, Leominster; Edward Mills, Clinton, all of Mass.

[73] Assignee: Quantum Corporation, Milpitas, Calif.

[21] Appl. No.: 240,545

[22] Filed: May 10, 1994

Related U.S. Application Data

[63] Continuation of Ser. No. 880,932, May 11, 1992, abandoned.

[51] Int. Cl.⁶ .................. G11B 21/16; B21D 39/00
[52] U.S. Cl. .................... 360/104; 29/522.1
[58] Field of Search .............. 360/104; 29/522.1, 603

[56] References Cited

U.S. PATENT DOCUMENTS

| | | | |
|---|---|---|---|
| 3,037,800 | 6/1962 | Laverty et al. | 29/522.1 |
| 4,949,194 | 8/1990 | MacPherson et al. | 360/104 |
| 4,991,045 | 2/1991 | Oberg | 360/104 |
| 5,027,241 | 6/1991 | Hatch et al. | 360/105 |
| 5,062,018 | 10/1991 | Yaeger | 360/104 |
| 5,153,794 | 10/1992 | Hinlein | 360/104 |
| 5,172,286 | 12/1992 | Jurgensen | 360/104 |
| 5,185,683 | 2/1993 | Oberg et al. | 360/104 |
| 5,187,626 | 2/1993 | Hopkins et al. | 360/104 |

FOREIGN PATENT DOCUMENTS

62-298012  6/1986  Japan .

*Primary Examiner*—John H. Wolff
*Assistant Examiner*—George J. Letscher
*Attorney, Agent, or Firm*—David B. Harrison

[57] ABSTRACT

A method and apparatus is provided for attaching magnetic disk drive actuator arms to read/write head suspension members. The arms and suspensions have through holes. The suspension member has a boss on its surface surrounding its through hole. To attach a suspension to an actuator arm, the hole in the arm is brought into alignment with the hole in the suspension such that the boss on the suspension protrudes into the hole in the arm. An expandable pin is inserted into the boss and holes. The expandable pin is then forced to expand radially, causing the boss to expand into an interference with the hole in the actuator arm, thus attaching the suspension and the arm. Because the forces applied to the actuator arm are limited to being axially applied to the walls of the hole, cracking of the actuator arm is avoided. Thus, actuator assemblies with ceramic actuators are provided.

20 Claims, 5 Drawing Sheets

METHOD AND APPARATUS FOR ATTACHING METALLIC AND CERAMIC MATERIALS

This application is a continuation, of application Ser. No. 07/880,932, filed May 11, 1992 which is abandoned.

BACKGROUND OF THE INVENTION

Magnetic disk drives are widely used in computers and data processing systems for storing information in digital form. Digital information is stored in magnetic disk drives as binary-encoded data which is magnetically recorded on a recording surface of a magnetic disk by selective magnetic polarization of regions of the surface of the disk. The recording surface of the magnetic disk is typically divided into narrow annular regions termed "tracks" of different radii. The tracks are assigned numbers to provide addresses for locating data on the recording surface.

Data stored on a magnetic disk is accessed as the disk rotates by means of a transducer called a read/write head. To read data from a rotating magnetic disk, the read/write head produces electronic read signals in response to the passage of magnetic polarized regions on the recording surface of the magnetic disk close by the read/write head as the disk rotates. To write data onto a rotating magnetic disk, the read/write head generates magnetic fields, capable of polarizing regions of the recording surface disk passing close by the head, in response to the imposition of electronic write signals on the read/write head.

In a conventional disk drive assembly, the read/write heads are secured to the distal ends of head suspension members. Several suspension members may be mounted in parallel, one to each side of each of a stack of disks. The proximal end of each suspension member is attached to an actuator arm. The actuator arm in turn is connected to a servo or stepper motor. The magnetic heads of the drive are moved to selected tracks on the disks by the servo or stepper motor via the actuator, its arms, and the connected head suspension members.

There are various methods of attaching head suspension members to an actuator arm. Such methods include glue, screws, clamps, and staking.

In one known staking method, two head suspension members are attached to the end of an actuator arm by means of two staking members having short tubular stems each of which is aligned through a hole in the head suspension member and into a through hole in the end of the actuator arm. The stems of the staking members are thereafter forcibly expanded within the structural material of the shelf segment of the actuator arm by driving a ball bearing through the stem tubes.

This particular method, although effective, has several limitations. The most significant limitation in expanding the stem of the staking members within the structural material of the arm is the possibility of cracking the arm during the staking procedure. Cracking of the arm often occurs despite the given thickness of the arm. The nature of the assembly employed in this method channels the force of the staking procedure in the direction in which the ball is forced through the staking members. If there is even a slight structural defect in the material of the actuator arm or if the actuator arm is deflected in the direction of the force applied to the ball, i.e., the axial direction, the arm will crack. This cracking results in defective assemblies and is a costly problem in mass manufacturing the actuator arm assemblies. The staking procedure is one of the last assembly procedures to take place in the manufacturing process. If the arm cracks during the staking procedure, the entire semi-complete multiple arm actuator assembly must be discarded at a significant cost.

In response to these limitations, another method of staking was developed in which only one staking member was employed. In this method, two head suspension members are first attached to opposing sides of the flange of the staking member, and then the staking member is subsequently secured to the actuator arm in a single staking procedure. The force exerted by the staking procedure is still channeled directly into the structural material of the arm, and some deflection of the arm occurs. Thus, cracking is still a limitation. As a result, a significant percentage of the actuator arm assemblies still have to be discarded.

The problem related to the cracking of the actuator arm becomes more severe with an anticipated change in structural materials to ceramics. The metallic materials presently used expand and contract slightly when exposed to changes in temperature due to a metallic material's inherent coefficient of thermal expansion. These expansions and contractions hinder the accurate placement of the magnetic heads on the disks. Because ceramic materials have a minimal coefficient of thermal expansion, there is an anticipated change in actuator arm materials to ceramics. This change will increase the accuracy of head placement by minimizing thermal expansions and contractions. However, this change creates problems in attaching head suspension members to ceramic actuator arms by any type of staking method. Expanding a staking member within an actuator arm formed from a ceramic material shatters the arm. The cracking problem described is a major hindrance in the development of technology related to ceramic actuator arms.

SUMMARY OF THE INVENTION

The present invention provides a method and apparatus for mechanically attaching a disk drive actuator arm to a read/write head suspension member. Each of the actuator arm and suspension member is provided with a through hole. The suspension member also comprises a boss on its surface around the hole. The actuator arm and suspension member are aligned such that the boss on the suspension member protrudes into the hole in the actuator arm, and the holes and the boss are all substantially coaxial. Next, an expandable pin is inserted through the holes and the boss. The pin is forced to expand radially such that its outside perimeter comes into contact with the boss. The boss expands into contact with the hole in the actuator arm, thus attaching the suspension member and the actuator arm. After the suspension member and actuator arm are attached, the expandable pin is removed from the holes.

In one embodiment of the invention, the pin comprises a central hole running along its axis. The pin also comprises slots running parallel to the axis of the pin. The slots extend radially from the central hole through the wall of the pin to the outside perimeter of the pin. To force the pin to expand, a spherical ball is forced through the central hole in the pin. Because the diameter of ball is larger than the diameter of the central hole, the pin expands radially at the slots.

The method and apparatus of the present invention minimize forces which may damage the materials during attachment. As the pin expands, primarily radial forces are present. Forces in the direction of the movement of the ball, i.e., the axial direction, are minimized. The pin is restrained against axial movement.

The present invention may be used to attach metallic suspension members to metallic actuator arms or to attach metallic suspension members to ceramic actuator arms. Typical metals used to make actuator arms attached to suspensions by the present invention include aluminum and magnesium. Ceramics used to make the actuator arms include silicon carbide. Because the forces on the ceramic are limited to being primarily radial from the center of the hole, cracking of the ceramic material is virtually eliminated. The ceramic is able to withstand the purely compressive forces from the radial expansion in the hole, and axial bending forces are virtually eliminated.

In one embodiment of the invention, the hole in the second material is shaped such that it has flat areas which come into contact with the boss when it expands. These flat areas key the materials to eliminate any relative rotation between them after they are attached. In a preferred embodiment, the hole is hexagonal in shape. In another embodiment, the hole is round.

The present invention has significant advantages over prior art methods. A first advantage is in the time saved by the present method. Only one attachment operation is required, even if several suspension members are being attached to actuator arms. For example, if two suspension members are to be attached to each of three actuator arms on an actuator, one prior staking method would require six incremental staking operations. Another prior method would require three operations. The present invention, however, only requires a single operation. The expandable pin is inserted through the three arms and six suspension members, and the ball is pressed through the pin sequentially through the six suspension members in one step. All six suspension members are thus attached to actuator arms.

The prior art staking procedure itself is inherently slower then the present invention. This is due to the direct contact between the ball and the inside of the staking member. The ball tends to gall with material from the staking member. Also, the ball tends to flatten during the procedure. If multiple suspension members and actuator arms are being attached, these two problems combine to substantially impede the process. The ball frequently must be removed in the middle of the procedure and exchanged. Also, balls cannot be reused from assembly to assembly.

The present invention eliminates these problems because there is no direct contact between the ball and the boss being expanded. They are separated from each other by the expandable pin. Thus the rubbing friction which causes the galling and flattening of the balls in the prior procedures is substantially reduced in the present invention. A ball can be reused over and over without having to be replaced.

A further advantage obtained in the present invention is the virtual elimination of cracking of actuator arms experienced in prior processes. As the ball is forced through the pin, the pin expands radially. This radial force is transmitted to the actuator arm through the expanding boss. The actuator arm is inherently more capable of resisting forces in the radial direction than in other directions. For example, axial forces tend to deflect and therefore crack the actuator arm. Since these forces are eliminated, cracking rarely occurs.

The reduction in deflection of the actuator arms during assembly also provides for the use of ceramic materials in actuator arms. Because of their extreme rigidity and minimal coefficient of thermal expansion, ceramic actuators can more accurately and quickly position the read/write head over the desired location on the disk. However, ceramics are also very brittle and therefore subject to cracking during the prior attachment processes. However, because deflection of the actuator arms during assembly is minimized in the present invention, the cracking problem is eliminated, and ceramic actuators may be assembled safely.

Another advantage realized by the present invention is that the attachment is purely mechanical. That is, it is only the interference between the two materials which holds them together. Other methods involve glue or other chemical adhesives. These chemicals tend to outgas for long periods of time. In environments such as the interior of a computer disk drive, this outgassing can be detrimental to performance. The mechanical attachment of the present invention eliminates this problem.

Significant cost savings will also be realized by use of the present invention. The time savings discussed above will naturally yield lower costs of production. Because cracking of actuator arms is eliminated, expensive actuator assemblies will no longer have to be discarded. Also, the attachment apparatus itself is much less expensive than that used in previous processes. It is estimated that the present invention apparatus will cost approximately 20% of the cost of the prior apparatus.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
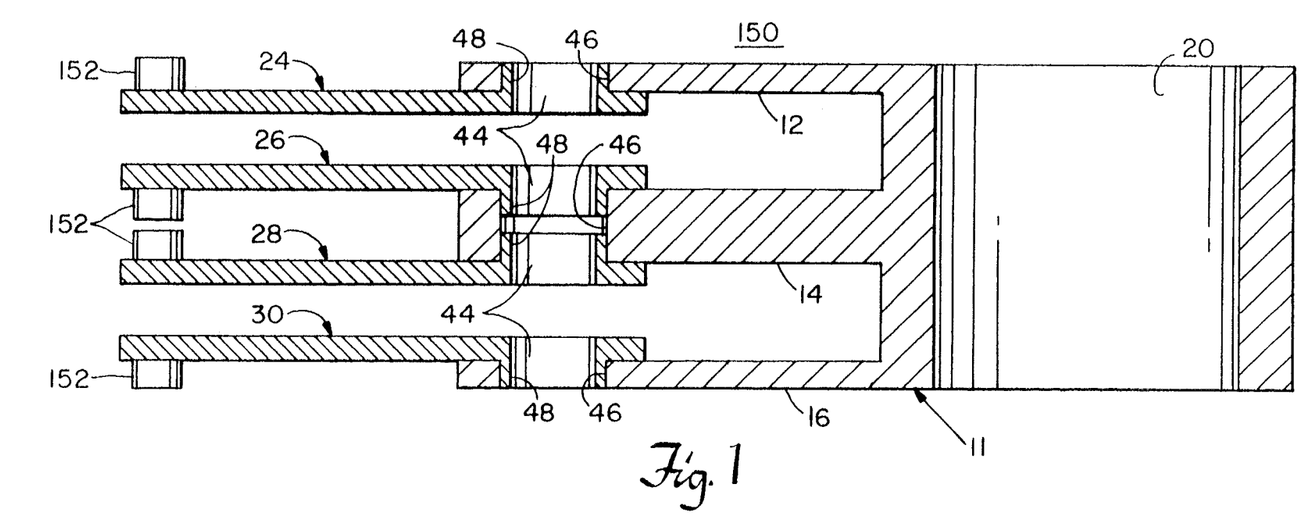
FIG. 1 is a cross section of an actuator assembly in accordance with the present invention.

FIG. 1 is a cross sectional schematic view of an actuator assembly 150 of the present invention. In this illustration, actuator 11 comprises three actuator arms 12, 14, and 16 and a through hole 20. Read/write heads 152 are attached to read/write head suspension members 24, 26, 28, and 30, also referred to as suspensions. Each of the suspensions 24, 26, 28, 30 is attached to an actuator arm 12, 14, 16. A hole 44 in each suspension 24, 26, 28, 30 is aligned with a hole 46 in an actuator arm 12, 14, 16. The boss 48 on the surface of the suspension 24, 26, 28, 30 protrudes into the hole 46 in the actuator arm 12, 14, 16. In the assembly 150, the bosses 48 have been expanded into contact with the holes 46 in the arms 12, 14, 16. It is this interference between the bosses 48 and the holes 46 which holds the suspensions 24, 26, 28, 30 and the arms 12, 14, 16 together.

Figure 2A:
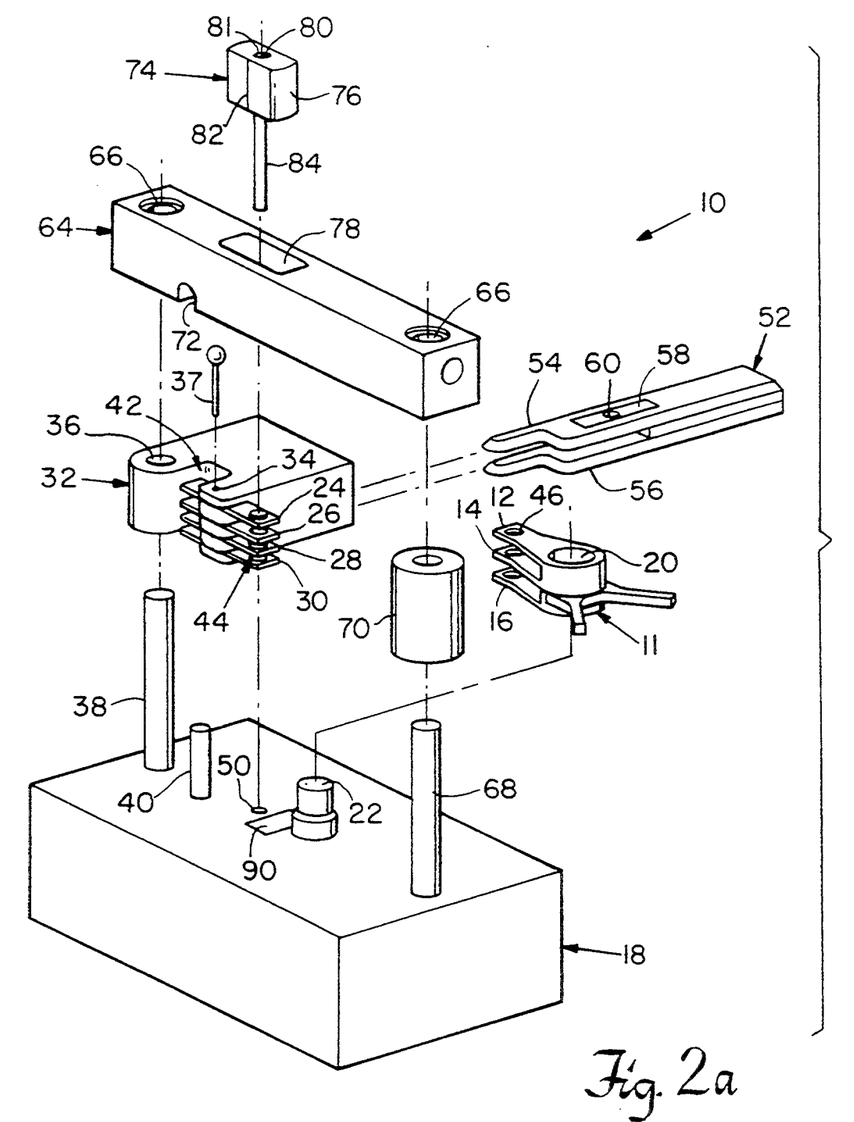
FIG. 2a is an exploded perspective showing the components of the attachment apparatus of the present invention.

FIG. 2a is a diagram of the preferred embodiment of the attachment apparatus 10 of the present invention. Actuator 11 is shown for illustration only as having three arms 12, 14 and 16. To ensure that the actuator 11 is properly located during the process, the hole 20 in the actuator 11 slides over actuator locating pin 22 on the base 18. During the attachment procedure, actuator 11 rests on a silicon rubber pad 90 affixed to base 18. The rubber pad 90 is used to prevent damage to the actuator 11.

Suspensions 24, 26, 28, and 30 are loaded into suspension carrier 32 before the process begins. The suspensions 24, 26, 28, 30 are loaded into the suspension carrier 32 such that the alignment holes 63 on the suspensions (not shown) are aligned with the alignment hole 34 through the carrier 32. Alignment pin 37 is inserted through the alignment holes 34 and 63 to hold the suspensions 24, 26, 28, 30 in place.

The suspension carrier 32 loaded with suspensions 24, 26, 28, 30 rests on the base 18 for the attachment process. The alignment hole 36 in the carrier 32 slides over the alignment pin 38 attached to the base 18. The carrier 32 is then rotated such that groove area 42 in the carrier 32 contacts locating pin 40 on the base 18. When the loaded suspension carrier 32 and the actuator 11 are properly loaded onto the base 18, they are in alignment to allow the attachment process to proceed. Holes 44 in the suspensions 24, 26, 28, 30 are aligned with holes 46 in actuator arms 12, 14, 16 and with hole 50 in the base 18.

Figure 2B:
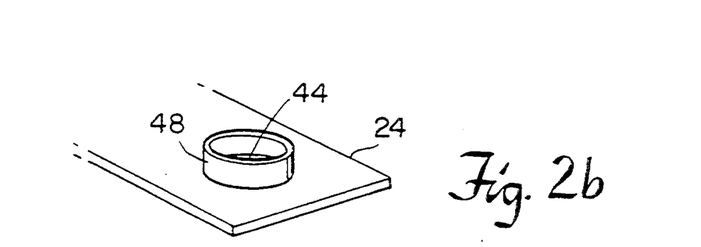
FIG. 2b is an expanded view of the end of a read/write head suspension member to be joined to an actuator arm.

In the illustration in FIG. 2a, suspension 24 is to be attached to the bottom side of actuator arm 12. Therefore, the suspension 24 is loaded into the suspension carrier 32 with its boss 48 facing up. FIG. 2b details the end of the typical suspension 24 which is to be attached to actuator arm 12. Boss 48 surrounds hole 44 and projects above the surface of the suspension 24. When the carrier 32 and the actuator 11 are loaded onto the base 18, the hole 44 in suspension 24 is aligned with the hole 46 in actuator arm 12, and the boss 48 oh suspension 24 protrudes into the bottom of hole 46 on actuator arm 12. Suspension 26 is to be attached to the top side of arm 14, and suspension 28 is to be attached to the bottom side of arm 14. To that end, suspension 26 is loaded into carrier 32 with its boss 48 facing down, and suspension 28 is loaded with its boss 48 facing up. The holes 44 in suspensions 26 and 28 are aligned with the hole 46 in arm 14. Boss 48 on suspension 26 protrudes into the top side of the hole 46 in arm 14, and boss 48 on suspension 28 protrudes into the bottom of the same hole 46. Suspension 30 is to be attached to the top side of arm 16. Therefore, the suspension 30 is loaded into the carrier 32 with its boss 48 facing down. The hole 44 in suspension 30 is aligned with the hole 46 in arm 16, and the boss 48 on suspension 30 protrudes into the top of hole 46 on suspension 16.

After the suspension carrier 32 and the actuator 11 are loaded onto the base 18, blades 54 and 56 of support comb 52 are inserted between the suspension members 24, 26, 28, 30. Specifically, in FIG. 2a, blade 54 is inserted in the gap between the bottom side of suspension 24 and the top side of suspension 26. Blade 56 is inserted in the gap between the bottom side of suspension 28 and the top side of suspension 30. The comb 52 is inserted such that the hole 60 through both blades 54 and 56 is aligned with all of the aligned holes 44, 46, and 50.

The thickness of each blade 54, 56 of the comb 52 is such that when a blade 54, 56 is inserted between suspensions 24, 26, 28, 30 which are properly positioned on actuator arms 12, 14, 16, the blade 54, 56 will come into contact with both suspensions. That is, when blade 54 is inserted between suspensions 24 and 26, it maintains contact with both of them. Thus, the blades 54, 56 of the comb 52 rub against the suspensions 24, 26, 28, 30. In this embodiment, the comb 52 is made of a soft material such as delrin. Rubbing of this soft material against the suspensions 24, 26, 28, 30 will wear the blades 54, 56 and reduce their thickness. To prevent this, metallic strips 58 are attached to surfaces of the blades which contact the suspensions 24, 26, 28, 30 during the attachment process.

The comb 52 serves at least two functions. First, it holds the suspensions 24, 26, 28, 30 in proper position against the appropriate actuator arms 12, 14, 16 to ensure correct attachment. Second, it supports the actuator arms 12, 14, 16 such that, during the attachment process, axial forces will be prevented from deflecting and cracking the actuator arms 12, 14, and 16.

Next, spacer 70 is slipped over alignment pin 68 on the base 18. A cover bridge 64 is then installed. Holes 16 in the bridge 64 slide over alignment pins 38 and 68 on the base 18. The bottom of the bridge 64 rests on top of suspension carrier 32 on one end and spacer 70 on the other end. A groove 72 is provided on the bottom of the bridge 64 to allow the bridge 64 to clear the head of alignment pin 37. A silicon rubber pad 65 (see FIG. 3) is affixed to the bottom side of the bridge 64 to prevent damage to the actuator 11 during the process.

Figure 3:
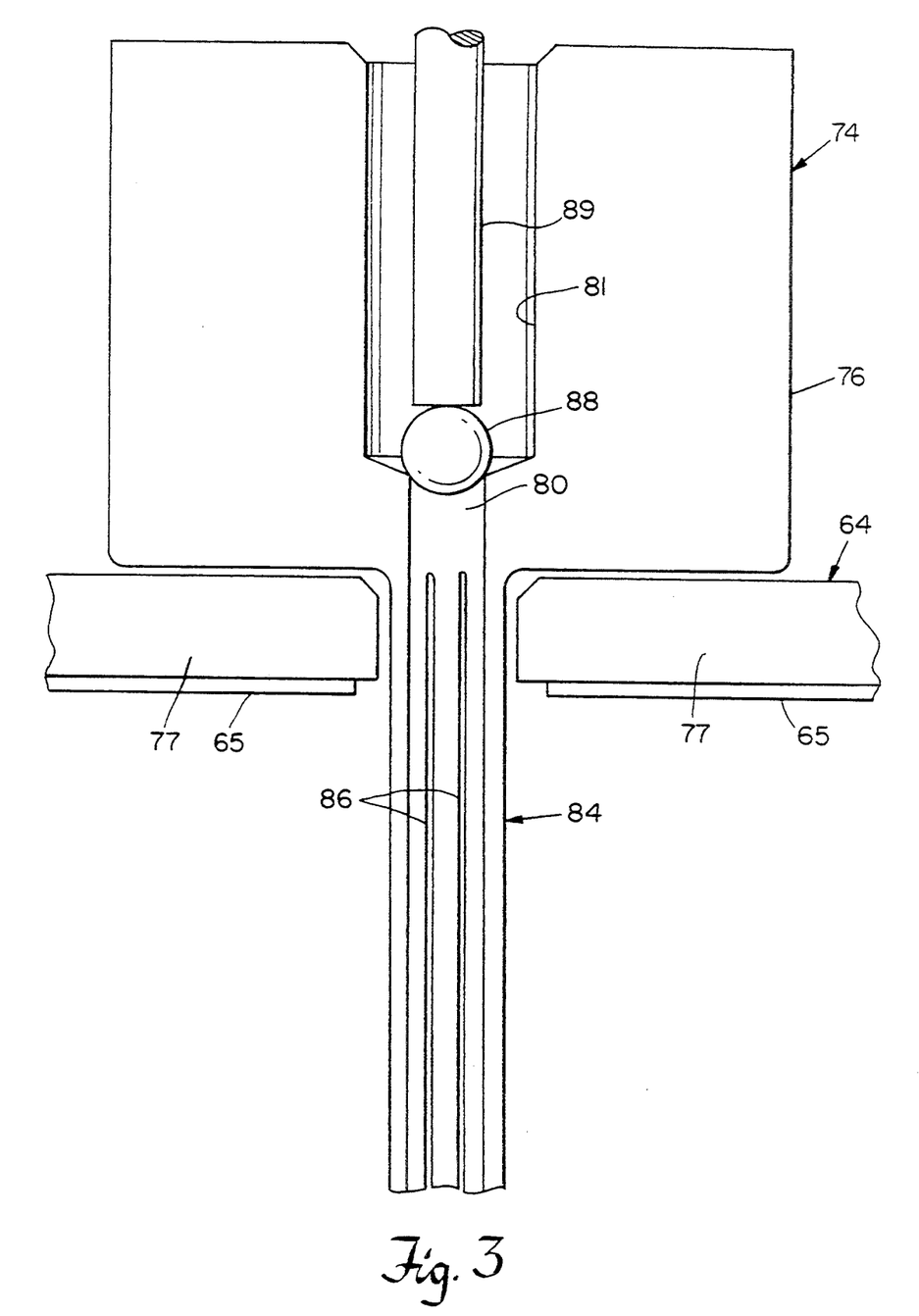
FIG. 3 is a cross section of the expandable pin of the present invention.

Expandable pin 74 is attached to bridge 64. It comprises a shaft 84 extending from a pin head 76. The pin 74 comprises two halves, having been cut lengthwise as indicated by the line 82 in the pin head 76 in FIG. 2a. A central hole 80 runs through the pin 74 from top to bottom along the central axis of the pin 74 as shown in FIG. 3. The top of the central hole 80 is counterbored 81 to a depth less than the height of the pin head 76. The shaft 84 is also slotted. The slots 86 run parallel to the cut 82 in the pin 74 from the bottom of the pin head 76 to the lower end of the shaft 84 of the pin 74. The slots 86 extend radially from the central hole 80 through the wall of the shaft 84. These slots 86 allow the shaft 84 to expand radially from the central hole 80. In this embodiment, there are four slots 86 cut in the shaft 84. Each half of the shaft 84 has two slots 86, thus splitting the wall of each half of the shaft 84 approximately into thirds. When the halves of the pin 74 are put together, the through cut 82 provides the fifth and sixth slots in the shaft 84. Thus, the shaft 84 effectively has six slots 86. They are positioned such that the slots 86 and the through cut 82 are equally spaced around the shaft 84 at approximate 60° intervals. Each of slots 86 and the effective slots provided by through cut 82 is approximately 0.004 inch wide. Although six effective slots is preferred, a total of four effective slots, one slot 86 cut in each of the two halves, has provided satisfactory results. More than six slots, on the other hand, are difficult to machine.

The pin 74 is mounted within the hole 78 in the bridge 64. Two spring-loaded plungers 83 (see FIG. 4) within the hole 78 press against the opposing halves of the pin head 76 to both hold the pin 74 together and to maintain the pin 74 in place within the bridge 64. The spring loaded plungers 83 have external threads and are threaded into holes in opposite sides of hole 78 (not shown). Each plunger 83 has a spring-loaded plunger tip 85 which rests in a notch 87 in pin head 76.

The pin 74 is mounted in the bridge 64 such that the bottom of the pin head 76 rests against the shelf section 77 of the bridge 64 (see FIG. 3). The shelf 77 prevents any axial movement of the pin 74 during the attachment process. The shaft 84 of the pin 74 extends through all of the holes 44 and 46 and into hole 50 in the base 18 when the bridge 64 is installed in the apparatus 10. The outside diameter of the shaft 84 is only slightly less than the inside diameter of the holes 44 in the suspensions 22 24, 26, 28.

After the apparatus 10 is thus set up, the attachment process may begin. A spherical ball 88 (see FIG. 3) is loaded into the top of the central hole 80 in the pin head 76. The diameter of the ball 88 is larger than the diameter of the central hole 80 but smaller than the diameter of the counterbore 81. Therefore, when the ball 88 is loaded, it rests within the counterbore 81 at the top of the hole 80. A solid forcing pin 89 having a diameter less than the diameter of the central hole 80 is inserted into the top of the hole 80 such that it rests against the top of the ball 88. Some mechanism for delivering downward force on the top of the forcing pin 89, such as an arbor press (not shown), is used to press down on the pin 89, thus driving the ball 88 down through the central hole 80.

Because the ball 88 has a larger diameter than the inside of the hole 80, the pin 74 expands at its slots 86 as the ball 88 travels through the pin 74. As the ball 88 passes each suspension/actuator arm pair, the shaft 84 forces the boss 48 to expand into the hole 46 in the arm 12, 14, 16.

As the ball 88 is forced downward and the shaft 84 expands, downward axial forces on the actuator arms 12, 14, 16 are minimized. The axial forces are minimized because the shaft 84 prevents direct contact between the ball 88 and the expanding boss 48. When the ball 88 directly contacts the boss 48, as in prior art processes, the surface of the ball 88 presents forces to the boss 48 in both the radial and axial directions. However, with the shaft 84 interposed between the ball 88 and the boss 48, it is the gradual radial expansion of the shaft 84 which applies the force to the boss 48. Virtually all of the force applied is in the radial direction. Also, frictional forces which would tend to force the actuator arm down are reduced by the pin 74. Because the pin head 76 is secured in the shelf 77 of the bridge 64, the pin 74 will not move down when the ball 88 is forced down. There are no axial forces applied by the shaft 84 to the boss 48 via friction. Friction is also reduced between the ball 88 and the shaft 84 because of the hardness of the pin 74. The pin 74 in the preferred embodiment is in the range of 52–55 Rockwell C hardness. This eliminates the friction and galling limitations of prior art attachment methods.

The ball 88 continues down through the hole 80, thus attaching each suspension 24, 26, 28, 30 to its designated actuator arm 12, 14, 16. When the ball 88 reaches the bottom of the hole 80, it falls out of the hole 80, through hole 50 in the base 18 and may be recovered from under the base 18 for another use. As shown in FIG. 1, after the suspensions are attached to the actuator arms to form the actuator assembly, the expandable pin is removed from the holes.

Figure 4:
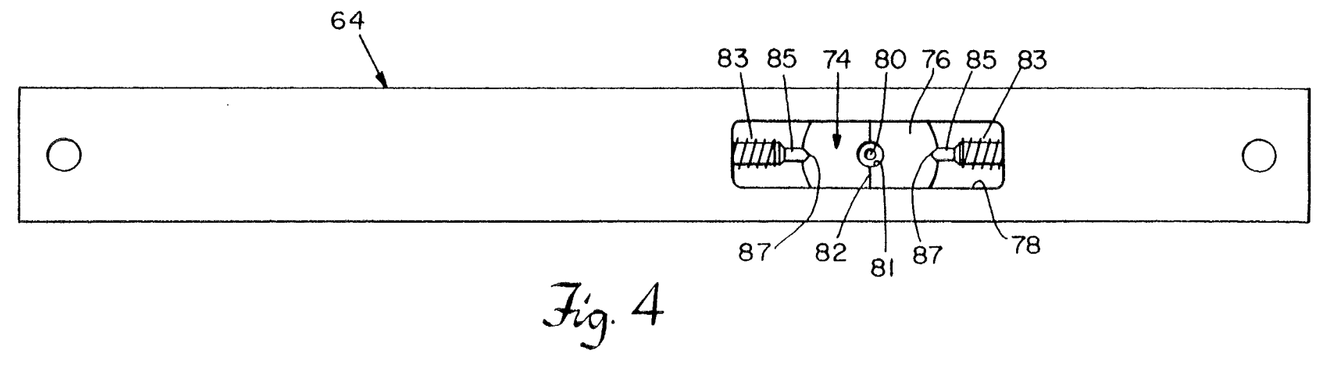
FIG. 4 is a top view of the bridge of the present invention.

As indicated above, when the process begins, an arbor press or any similar device applies a downward force to the top of forcing pin 89. The ball 88 is forced into the hole 80. It should be noted that even though the slots 86 do not extend to the top of the hole 80, the ball 88 will enter the hole 80 with minimal resistance. This is because the pin 74, as discussed above, is actually split in two halves by central cut 82 shown in FIG. 2a. The two halves are held together by spring-loaded plungers 83 (FIG. 4). Therefore, when the ball 88 enters the top of the hole 80, the two halves of the pin 74 separate slightly at the cut 82 against the spring force of the spring-loaded plungers 83. When the ball 88 reaches the shaft 84 of the pin 74, the shaft 84 expands radially at the slots 86 and the cut 82.

The embodiment shown in FIG. 3 comprises a 0.0360 inch diameter hole 80 and a 0.0450 inch diameter ball 88. Each slot is 0.006 inch wide. The diameter of the counterbore 81 is 0.0625 inch, and the outside diameter of the shaft 84 of the pin 74 is 0.0760 inch. Variations of all of these dimensions are possible and are generally dictated by the dimensions and materials of the final product.

Figure 5:
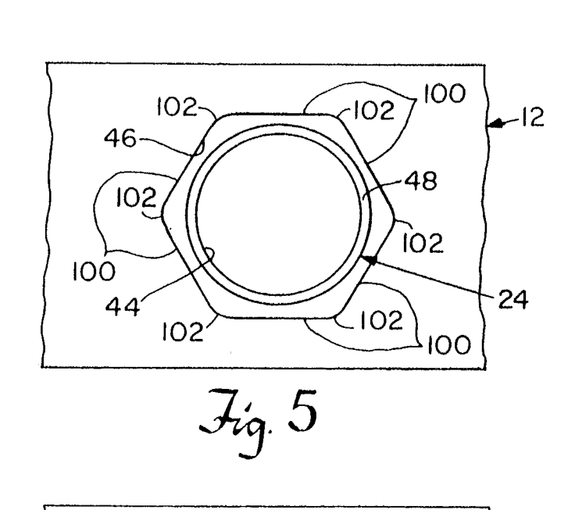
FIG. 5 is an expanded top view of the end of an actuator arm with suspension boss before the process of the present invention.

FIG. 5 is a detailed view of the end of an actuator arm 12 looking into the hole 46 before the process of the present invention. Hole 46 is substantially hexagonal in shape. The flat surfaces 100 of the hexagonal shape are joined at radii 102. This shape is used to provide a "keying" function when the arm 12 is attached to a suspension 24. The boss 48 on the suspension 24 is shown not yet expanded into contact with the hole 46. When the boss 48 on a suspension 24 expands into the hole 46 during the attachment process, it will make contact with the flat surfaces 100 inside the hole 46. The result is that relative rotation between the arm 12 and the suspension 24 after attachment is eliminated.

Figure 6:
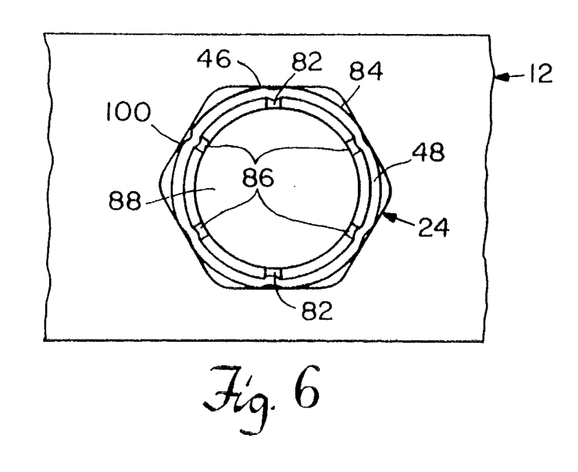
FIG. 6 is an expanded top view of the end of an actuator arm with an expanded pin therein during the process of the present invention.

FIG. 6 shows the end of an actuator arm 12 during the attachment process. The boss 48 has been expanded inside the hole 46 by the shaft 84 of the pin 74 and the ball 88. The individual sections of the slotted shaft 84 are shown in contact with the boss 48. The boss 48 has expanded such that it has assumed the shape of almost the entire hexagonal surface of the inside of the hole 46. The interference between the expanded boss 48 on the suspension 24 and the hole 46 in the actuator arm 12 forms the attachment between the suspension 24 and the arm 12. Because the boss 48 has expanded against the flat surfaces 100, the arm 12 and the attached suspension 24 are keyed. That is, they will not rotate relative to each other in the plane of the arm 12.

Figure 7:
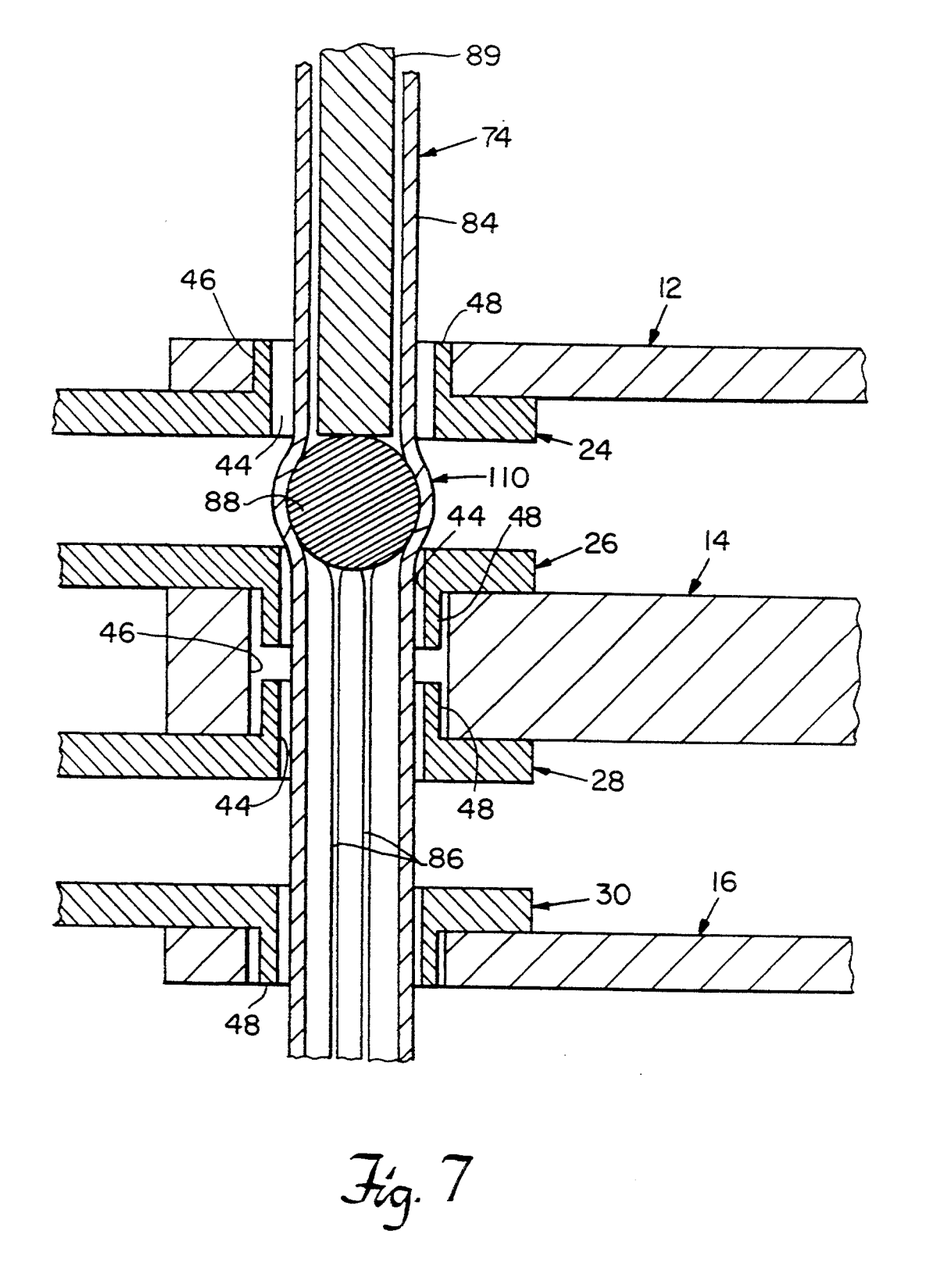
FIG. 7 is a cross section of the suspensions and actuator arms of the present invention during the attachment process.

FIG. 7 is a cross section of the suspensions 24, 26, 28, 30, the actuator arms 12, 14, 16, the shaft 84 of the pin 74 with slots 86, the ball 88, and the forcing pin 89 during the attachment process. Note that the comb 52 has been omitted to maintain clarity of the drawing. Forcing pin 89 has pressed the ball 88 part of the way through shaft 84. As a result, the process has completed attaching suspension 24 to arm 12. Suspensions 26, 28, and 30 have not yet been attached to arms 14 and 16.

In the suspension/actuator arm pair which has been attached, the boss 48 on the suspension 24 has been expanded into contact with the wall of hole 46 in arm 12. In the suspension/actuator arm pairs yet to be attached, the bosses 48 have not yet been expanded. As the forcing pin 89 presses the ball 88 through these pairs, the shaft 84 will expand 110 at its slots 86 and through cut 82 inside the bosses 48. The slots 86 are shown expanded close to the ball 88. The bosses 48 will in turn be forced to expand into contact with the walls of the holes 46. The resulting interference between the bosses 48 and the holes 46 forms the attachment between the suspensions 26, 28, and 30 and the arms 14 and 16.

Figure 8A:
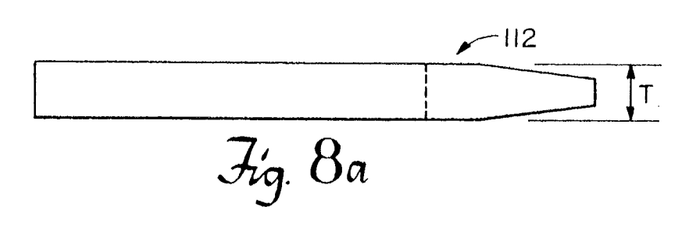
FIGS. 8a–8c depict a key used in the apparatus of the present invention.
Figure 8B:
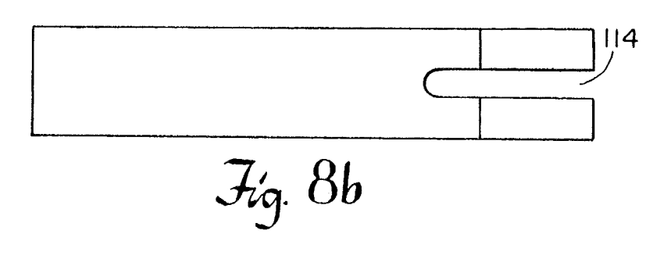
Figure 8C:
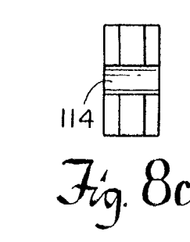

It should be noted that the present invention may be used to attach suspensions to any practical number of actuator arms on an actuator 11. The comb 52 of FIG. 2a may be replaced with individual keys 112 to hold the suspensions in place and support the actuator arms during the process. FIGS. 8a–8b illustrate a typical key 112 similar to those used in prior staking methods. FIG. 8a is a side view of the key; FIG. 8b is a top view; FIG. 8c is an end view looking into slot 114. When setting up the apparatus 10 for the process, a key 112 is inserted between each pair of suspensions being attached in the same fashion the blades 54 and 56 of the comb 52 are inserted. The groove 114 in the key 112 surrounds the holes in the suspension and actuator arm to allow clearance for the shaft 84 of the pin 74. As with the blades 54, 56 of the comb 52, the thickness T of the key is sufficient to hold the suspensions in their proper positions during the process and to prevent deflection of actuator arms.

While this invention has been particularly shown and described with references to preferred embodiments thereof, it will be understood by those skilled in the art that various changes in form and details may be made therein without departing from the spirit and scope of the invention as defined by the appended claims.

For example, a ball 88 driven by a pin 89 is preferred as the device for expanding the expandable pin 74 since it results in very low contact area and thus high force per area for a given force. However, other shapes and devices may be used.

Figure 9:
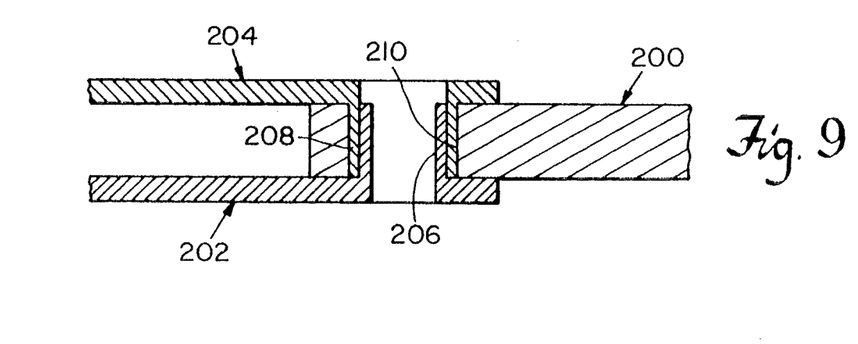
FIG. 9 is a cross section of an alternative configuration of an actuator arm and suspension assembled in accordance with the present invention.

Also, different suspension/actuator arm configurations are possible. For example, FIG. 9 shows a cross-section of an actuator arm 200 attached to suspensions 202 and 204. Boss 208 on suspension 204 slips inside hole 210 on actuator arm 200. Boss 206 on suspension 202 slips inside boss 208 on suspension 204. The expandable pin 74 is inserted into boss 206 and forced to expand. Both bosses 206 and 208 expand into contact with hole 210. The interference thus created holds the two suspensions 202, 204 and the actuator arm 200 together.

We claim:

1. A method of mechanically attaching a computer disk drive actuator arm to a read/write head suspension member said suspension member having a first hole at one end thereof and including an integral sleeve-like boss which is substantially coaxial with said first hole, said method comprising the steps of:

aligning the first hole through the suspension member with a second hole through the actuator arm such that during assembly said boss around the hole in the suspension member protrudes into the second hole in the actuator arm, the first and second holes and the boss being substantially coaxial;

inserting an expandable split pin having an axial central hole through the first and second holes and the boss;

inserting a removable expander member of a material harder than the pin into the axial central hole to three the pin to expand radially such that the outside perimeter of the pin contacts and forces the inside perimeter of the boss radially outwards to expand the boss into frictional contact with the perimeter of the second hole in the actuator arm; and supporting the pin against axial movement such that as the pin expands radially, axial forces on the actuator arm are substantially eliminated.

2. The method of claim 1 wherein the expandable pin comprises:
   a central hole substantially coaxial with the pin, and
   slots running parallel to the axis of the pin and extending radially from the central hole through the wall of the pin.

3. The method of claim 1 wherein the step of inserting comprises restraining the pin against axial movement.

4. The method of claim 1 wherein the suspension member is made of a metal.

5. The method of claim 1 wherein the actuator arm is made of a metal.

6. The method of claim 5 wherein the metal is aluminum.

7. The method of claim 5 wherein the metal is magnesium.

8. The method of claim 1 wherein the actuator arm is made of a ceramic.

9. The method of claim 8 wherein the ceramic is silicon carbide.

10. The method of claim 1 wherein the hole in the actuator arm is shaped such that it comprises flat surfaces for contacting the boss.

11. The method of claim 1 wherein the hole in the actuator arm is substantially hexagonal in shape.

12. The method of claim 1 including the steps of:
    attaching a second actuator arm to a second suspension member;
    aligning a hole through a sleeve like boss in the second suspension member with a hole through the second actuator arm such that a second boss in the second suspension member protrudes into the hole in the second actuator arm, all of the holes and bosses being substantially coaxial; and
    inserting the expandable split pin through the holes and boss.

13. Apparatus for mechanically attaching and fastening a computer disk drive actuator arm to a read/write head suspension arm member wherein the suspension arm member has a sleeve-like boss formed at one end thereof, said actuator arm having an extremely with a hole of a first diameter, said sleeve-like boss having a hole and an outside sleeve diameter which fits within said hole of first diameter, said apparatus comprising:

a base for aligning a hole through the boss of the suspension arm member with the hole through the actuator arm such that the boss of the suspension member protrudes into the hole in the actuator arm, the hole and the boss being substantially coaxial;

a removable split pin which is radially expandable, which is inserted into said sleeve-like boss;

a removable expander which is insertable for radially forcing the pin to expand radially such that an outside envelope of the pin contacts the inside perimeter of the boss on the suspension arm member, thereby expanding the boss into frictional contact with the perimeter of the hole in the actuator arm, wherein said removable expander comprises a ball which is harder than the pin; and a pin support for supporting the expandable pin against axial movement such that as the pin expands radially, axial forces on the actuator arm are substantially eliminated.

14. The apparatus of claim 13 wherein the expandable pin is split in two pieces along its axis.

15. The apparatus of claim 14 wherein the ball is substantially spherical, the ball being pressed through the central hole of the pin, the diameter of the ball being larger than the diameter of the central hole.

16. The apparatus of claim 13 further comprising a pin support shelf for restraining the pin against axial movement.

17. A method of mechanically attaching a computer disk drive actuator to a read/write head suspension member comprising the steps of:

aligning a hole through the suspension member with a hole through the actuator arm such that a boss around the hole in the suspension member protrudes into the hole in the actuator arm, the holes and the boss being substantially coaxial;

inserting an expandable split pin through the holes and the boss;

supporting the pin against axial movement;

forcing the pin to expand radially by using a member of a material harder than the pin such that an outside perimeter of the pin contacts and exerts radial, outward forces to an inside perimeter of the boss, and the boss expands into frictional contact with an inside perimeter of the hole in the actuator arm; and removing the pin from the holes after the actuator arm and its corresponding suspension member are attached.

18. A method of mechanically attaching a computer disk drive actuator arm to a read/write head suspension member said suspension member having a first hole at one end thereof and including an integral sleeve-like boss which is substantially coaxial with said first hole, said method comprising the steps of:

aligning the first hole through the suspension member with a second hole through the actuator arm such that during assembly said boss around the hole in the suspension member protrudes into the second hole in the actuator arm, the first and second holes and the boss being substantially coaxial;

inserting an expandable split pin having an axial central hole through the first and second holes and the boss, wherein the pin comprises:

a central hole substantially coaxial with the pin, and slots running parallel to the axis of the pin and extending radially from the central hole through the wall of the pin;

forcing the pin to expand radially such that the outside perimeter of the pin contacts and forces the inside perimeter of the boss radially outwards to expand the boss into frictional contact with the perimeter of the second hole in the actuator arm, wherein the step of forcing comprises pressing a substantially spherical ball through the central hole of the pin, the diameter of said ball being larger than the diameter of the central hole the ball being of a material harder than the pin; and supporting the pin against axial movement such that as the pin expands radially, axial forces on the actuator arm are substantially eliminated.

19. Apparatus for mechanically attaching and fastening a computer disk drive actuator arm to a read/write head suspension arm member wherein the suspension arm member has a sleeve-like boss formed at one end thereof, said actuator arm having an extremely with a hole of a first diameter, said sleeve-like boss having a hole and an outside sleeve diameter which fits within said hole of first diameter, said apparatus comprising:

a base for aligning a hole through the boss of the suspension arm member with the hole through the actuator arm such that the boss of the suspension member protrudes into the hole in the actuator arm, the hole and the boss being substantially coaxial;

a removable split pin which is radially expandable, which is inserted into said sleeve-like boss, wherein the pin comprises:

a central hole substantially coaxial with the pin, a wall, and slots running parallel to the axis of the pin and extending radially from the central hole through the wall of the pin;

a removable expander which is insertable for radially forcing the pin to expand radially such that an outside envelope of the pin contacts the inside perimeter of the boss on the suspension arm member, thereby expanding the boss into frictional contact with the perimeter of the hole in the actuator arm, wherein said removable expander comprises a ball which is harder than the pin; and a pin support for supporting the expandable pin against axial movement such that as the pin expands radially, axial forces on the actuator arm are substantially eliminated, whereby because of lack of axial galling inside the hole in the sleeve-like boss, axial forces on and breakage of the actuator arm during attaching and fastening are substantially eliminated.

20. The apparatus of claim 19, wherein the ball is substantially spherical, the ball being pressed through the central hole of the pin, the diameter of the ball being larger than the diameter of the central hole.

* * * * *